United States Patent
Tseng et al.

(10) Patent No.: US 9,424,206 B2
(45) Date of Patent: Aug. 23, 2016

(54) COMMAND EXECUTING METHOD, CONNECTOR AND MEMORY STORAGE DEVICE

(71) Applicant: PHISON ELECTRONICS CORP., Miaoli (TW)

(72) Inventors: Ming-Hui Tseng, Hsinchu (TW); Kian-Fui Seng, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 13/971,838

(22) Filed: Aug. 21, 2013

(65) Prior Publication Data
US 2015/0012670 A1    Jan. 8, 2015

(30) Foreign Application Priority Data
Jul. 5, 2013    (TW) .............. 102124203 A

(51) Int. Cl.
- G06F 3/00    (2006.01)
- G06F 13/00   (2006.01)
- G06F 13/16   (2006.01)

(52) U.S. Cl.
CPC ............ *G06F 13/00* (2013.01); *G06F 13/1673* (2013.01)

(58) Field of Classification Search
CPC .................................................... G06F 3/0659
See application file for complete search history.

(56) References Cited

U.S. PATENT DOCUMENTS

| | | | | |
|---|---|---|---|---|
| 6,145,052 A * | 11/2000 | Howe et al. | .................. | 711/112 |
| 6,941,427 B2 * | 9/2005 | Solomon et al. | ............. | 711/156 |
| 2007/0088856 A1 * | 4/2007 | Zhang | .................. | G06F 13/102 710/6 |
| 2008/0303837 A1 * | 12/2008 | Swift | .................... | G06F 9/5044 345/541 |
| 2009/0094385 A1 * | 4/2009 | Freking et al. | .................... | 710/5 |
| 2010/0281225 A1 * | 11/2010 | Chen et al. | .................... | 711/147 |
| 2011/0131375 A1 * | 6/2011 | Noeldner | ............... | G06F 12/00 711/114 |
| 2011/0134147 A1 * | 6/2011 | Brichter et al. | ............... | 345/667 |
| 2011/0145448 A1 * | 6/2011 | Gordon | .......................... | 710/38 |

FOREIGN PATENT DOCUMENTS

TW    201222256    6/2012

* cited by examiner

*Primary Examiner* — Elias Mamo
(74) *Attorney, Agent, or Firm* — Jianq Chyun IP Office

(57) ABSTRACT

A command executing method, a connector and a memory storage device are provided. The command executing method includes: receiving at least one command and at least one tag corresponding to the command from a host system, and temporarily storing the command in a command queue; transmitting the tag to the host system and executing the command; determining whether an operating status of the memory storage device meets a predetermined condition; and if the operating status meets the predetermined condition, transmitting a configuration message to the host system to release the tag from corresponding to the command. Accordingly, the access bandwidth of the memory storage device is increased.

21 Claims, 7 Drawing Sheets

COMMAND EXECUTING METHOD, CONNECTOR AND MEMORY STORAGE DEVICE

CROSS-REFERENCE TO RELATED APPLICATION

This application claims the priority benefit of Taiwan application serial no. 102124203, filed on Jul. 5, 2013. The entirety of the above-mentioned patent application is hereby incorporated by reference herein and made a part of this specification.

BACKGROUND

1. Technology Field

The invention relates to a command executing method, and more particularly, to a command executing method for a rewritable non-volatile memory module, and a connector and a memory storage device using the same.

2. Description of Related Art

The markets of digital cameras, cellular phones, and MP3 players have expanded rapidly in recent years, resulting in escalated demand for storage media by consumers. The characteristics of data non-volatility, low power consumption, and compact size make the rewritable non-volatile memory module (e.g., flash memory) ideal for being built in the portable multi-media devices as cited above.

Generally, a rewritable non-volatile memory module is controlled by a memory controller, and coupled to a host system through a connector. The host system issues commands for the memory controller to access data in the rewritable non-volatile memory module. In some standards, a command queue is defined for storing the commands issued by the host system in the command queue, so the memory controller can decide an execution sequence for the commands. The host system and the memory controller can decide which command is to be executed by utilizing a tag. When there is one tag still corresponding to one of the commands, it is then deemed by the host system that execution of the corresponding command is not completed. Accordingly, after one command is executed, the connector sends a message to the host system, so as to release one tag from corresponding to such command. However, in case the data that the command intended to access is very small, the message may significantly reduce an access bandwidth of the memory storage device. Therefore, how to increase the access bandwidth of the memory storage device is one of the major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a command executing method capable of increasing an access bandwidth of the memory storage device, and a connector and a memory storage device using the same.

The exemplary embodiment of the present invention provides a command executing method for a memory storage device. The method includes: receiving at least one command and at least one tag corresponding to the command from a host system, and temporarily storing the command in a command queue; transmitting the tag to the host system and executing the command; determining whether an operating status of the memory storage device meets a predetermined condition; and if the operating status meets the predetermined condition, transmitting a configuration message to the host system to release the tag from corresponding to the command.

From another perspective, a connector is provided according to an exemplary embodiment of the invention, and the connector includes a memory, a transmission circuit, a control circuit, an access circuit and a flag circuit. The memory is configured to store a command queue. The transmission circuit is coupled to the memory and configured to receive at least one command and at least one tag corresponding to the command from a host system, and temporarily store the command in a command queue. The access circuit is coupled to the memory. The control circuit is coupled to the transmission circuit and the access circuit. The transmission circuit is configured to transmit the tag to the host system, and the access circuit is configured to execute the command. The control circuit is configured to determine whether an operating status of the memory storage device meets a predetermined condition. If the operating status meets the predetermined condition, the transmission circuit transmits a configuration message to the host system to release the tag from corresponding to the command.

From another perspective, a memory storage device is provided according to an exemplary embodiment of the invention, and the memory storage device includes a connector, a rewritable non-volatile memory module and a memory controller. The connector is configured to couple to a host system. The rewritable non-volatile memory module includes a plurality of physical erasing units. The memory controller is coupled to the connector and the rewritable non-volatile memory. The connector includes a memory, a transmission circuit, an access circuit and a control circuit. The memory is configured to store a command queue. The transmission circuit is coupled to the memory and configured to receive at least one command and at least one tag corresponding to the command from a host system, and temporarily store the command in a command queue. The access circuit is coupled to the memory. The control circuit is coupled to the transmission circuit and the access circuit. The transmission circuit is configured to transmit the tag to the host system, and the access circuit is configured to execute the command. The control circuit is configured to determine whether an operating status of the memory storage device meets a predetermined condition. If the operating status meets the predetermined condition, the transmission circuit transmits a configuration message to the host system to release the tag from corresponding to the command.

In summary, the command executing method, the connector and the memory storage device as provided in the exemplary embodiments of the invention are capable of transmitting the configuration message to the host system when the operating status of the memory storage device meets the predetermined condition, so as to release the tag from corresponding to the command. Accordingly, the access bandwidth of the memory storage device is increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the disclosure more comprehensible, several embodiments accompanied with drawings are described in detail as follows.

DESCRIPTION OF THE EMBODIMENTS

Figure 1A:
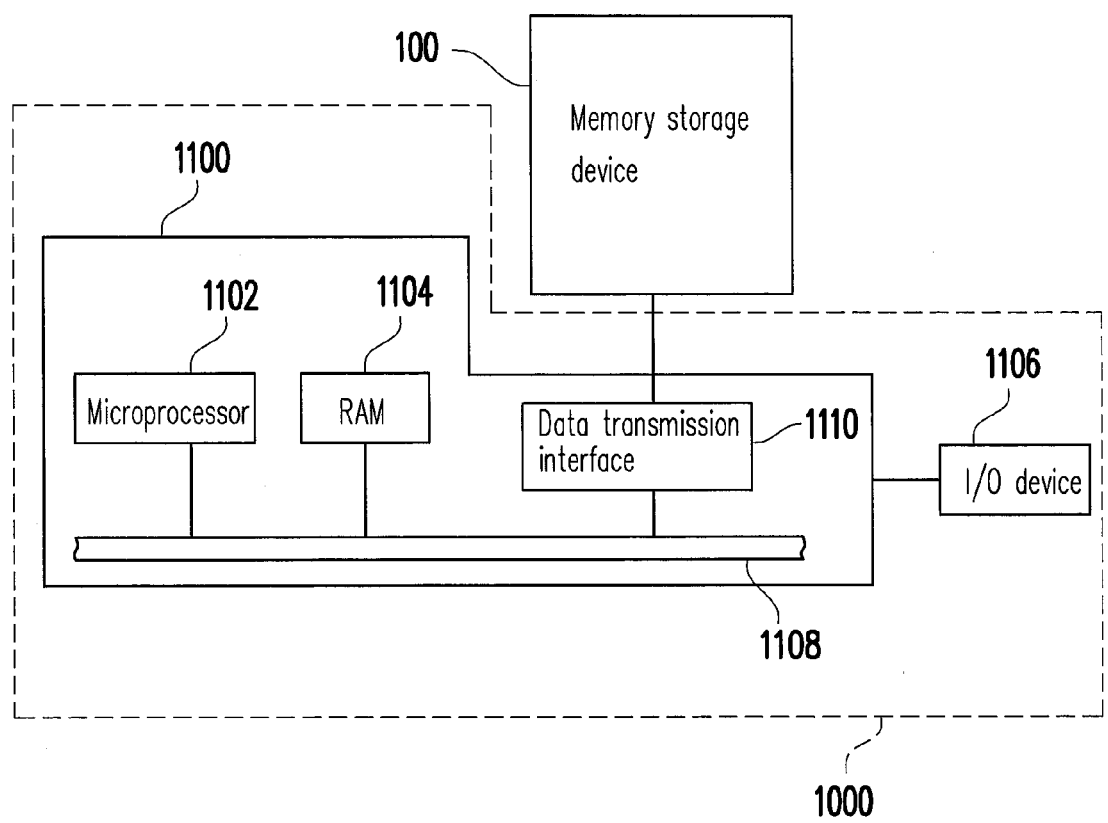
FIG. 1A illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

FIG. 1A illustrates a host system and a memory storage device according to an exemplary embodiment.

Figure 1B:
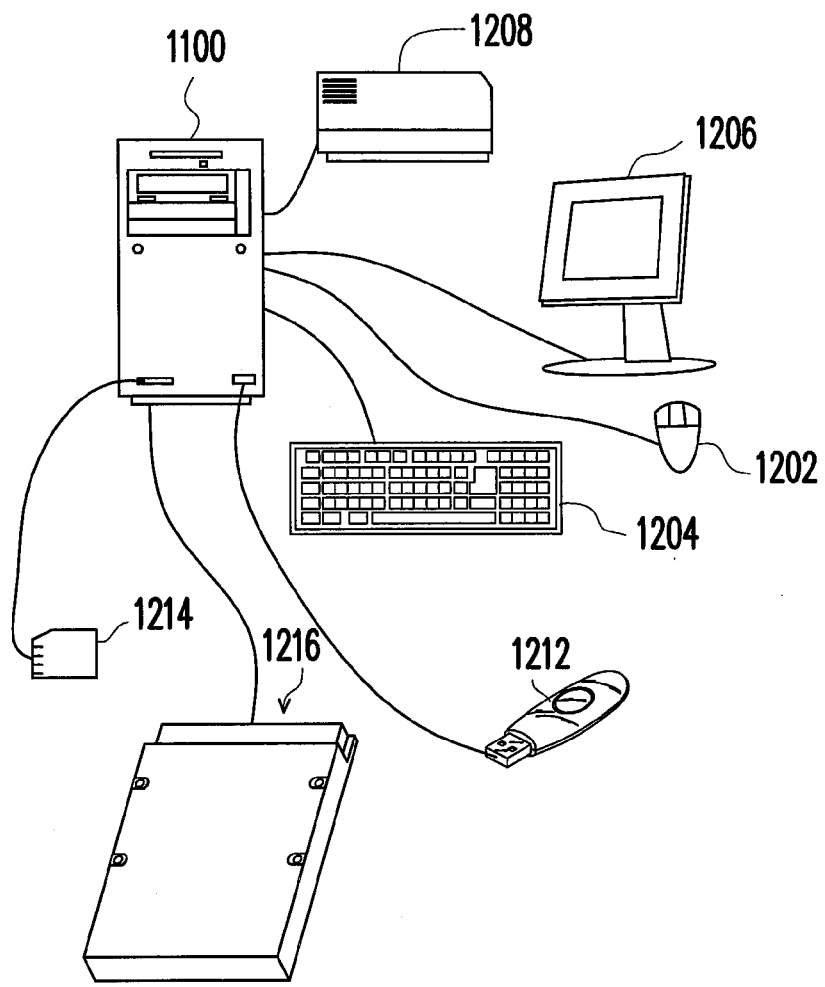
FIG. 1B is a schematic diagram illustrating a computer, an input/output device and a memory storage device according to an exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206 and a printer 1208 as shown in FIG. 1B. It should be understood that the devices illustrated in FIG. 1B are not intended to limit the I/O device 1106, and the I/O device 1106 may further include other devices.

In the embodiment of the invention, the memory storage device 100 is coupled to the devices of the host system 1000 through the data transmission interface 1110. By using the microprocessor 1102, the random access memory (RAM) 1104 and the Input/Output (I/O) device 1106, data may be written to the memory storage device 100 or may be read from the memory storage device 100. For example, the memory storage device 100 may be a rewritable non-volatile memory storage device such as a flash drive 1212, a memory card 1214, or a solid state drive (SSD) 1216 as shown in FIG. 2.

Figure 1C:
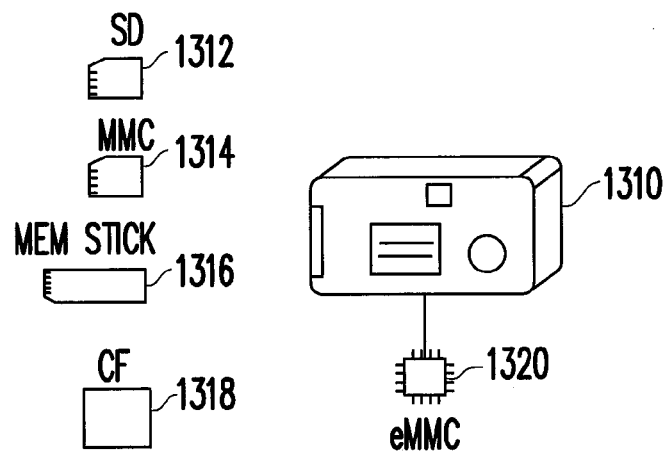
FIG. 1C is a schematic diagram of a host system and a memory storage device according to an exemplary embodiment.

Generally, the host system 1000 may substantially be any system capable of storing data with the memory storage device 100. Although the host system 1000 is described as a computer system in the present exemplary embodiment, in another exemplary embodiment of the invention, the host system 1000 may be a digital camera, a video camera, a telecommunication device, an audio player, or a video player. For example, if the host system is a digital camera (video camera) 1310, the rewritable non-volatile memory storage device may be a SD card 1312, a MMC card 1314, a memory stick 1316, a CF card 1318 or an embedded storage apparatus 1320 (as shown in FIG. 1C). The embedded storage apparatus 1320 includes an embedded MMC (eMMC). It should be mentioned that the eMMC is directly coupled to a substrate of the host system.

Figure 2:
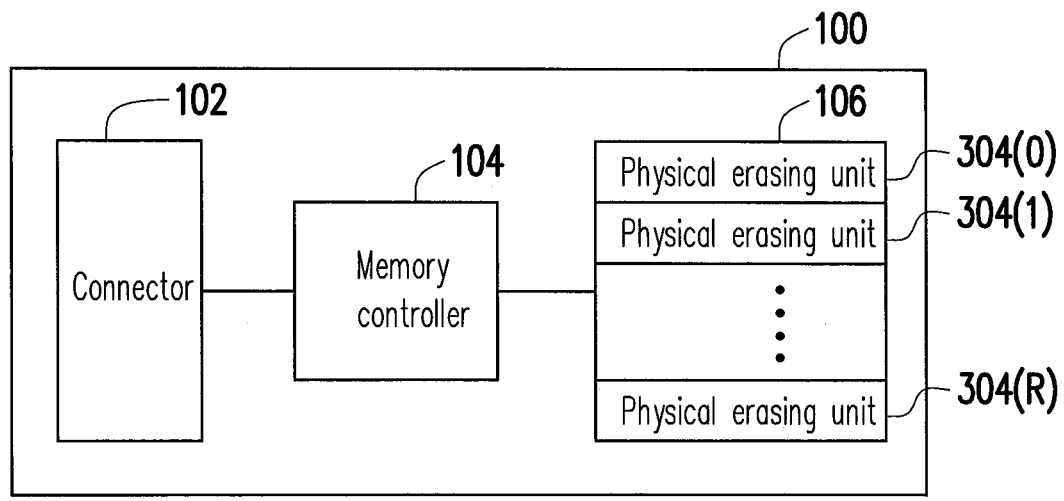
FIG. 2 is a schematic block diagram of the memory storage device depicted in FIG. 1A.

FIG. 2 is a schematic block diagram of the memory storage device depicted in FIG. 1A.

Referring to FIG. 2, the memory storage device 100 includes a connector 102, a memory controller 104 and a rewritable non-volatile memory module 106.

In the present exemplary embodiment, the connector 102 is compatible with a serial advanced technology attachment (SATA) standard. However, the invention is not limited thereto, and the connector 102 may also be compatible with a Parallel Advanced Technology Attachment (PATA) standard, an Institute of Electrical and Electronic Engineers (IEEE) 1394 standard, a peripheral component interconnect (PCI) Express interface standard, a universal serial bus (USB) standard, a secure digital (SD) interface standard, a Ultra High Speed-I (UHS-I) interface standard, a Ultra High Speed-II (UHS-II) interface standard, a memory sick (MS) interface standard, a multi media card (MMC) interface standard, an embedded MMC (eMMC) interface standard, a Universal Flash Storage (UFS) interface standard, a compact flash (CF) interface standard, an integrated device electronics (IDE) interface standard or other suitable standards.

The memory controller 104 is configured to execute a plurality of logic gates or control commands which are implemented in a hardware form or in a firmware form, so as to perform operations of writing, reading or erasing data in the rewritable non-volatile memory module 106 according to the commands of the host 1000.

The rewritable non-volatile memory module 106 is coupled to the memory controller 104 and configured to store data written from the host system 1000. The rewritable non-volatile memory module 106 includes multiple physical erasing units 304(0) to 304(R). For example, the physical erasing units 304(0) to 304(R) may belong to the same memory die or belong to different memory dies. Each physical erasing unit has a plurality of physical programming units, and the physical programming units in the same physical erasing unit may be written separately and erased simultaneously. For example, each physical erasing unit is composed by 128 physical programming units. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each physical programming unit usually includes a data bit area and a redundancy bit area. The data bit area having multiple physical access address is used to store user data, and the redundant bit area is used to store system data (for example, control information and error checking and correcting code). In the present exemplary embodiment, each data bit area of the physical programming unit contains 4 physical access addresses, and the size of each physical access address is 512-byte (B). However, in other exemplary embodiments, the data bit area may also include 8, 16, or more or less of the physical address, and amount and sizes of the physical access address are not limited in the invention. For example, the physical erasing unit is a physical block, and the physical programming unit is a physical page or a physical sector.

In the present exemplary embodiment, a rewritable non-volatile memory module 106 is a Multi Level Cell (MLC) NAND flash memory module which stores at least 2 bits of data in one cell. The rewritable non-volatile memory module 106 may also be a Single Level Cell (SLC) NAND flash memory module, a Trinary Level Cell (TLC) NAND flash memory module, other flash memory modules or any memory module having the same features.

Figure 3:
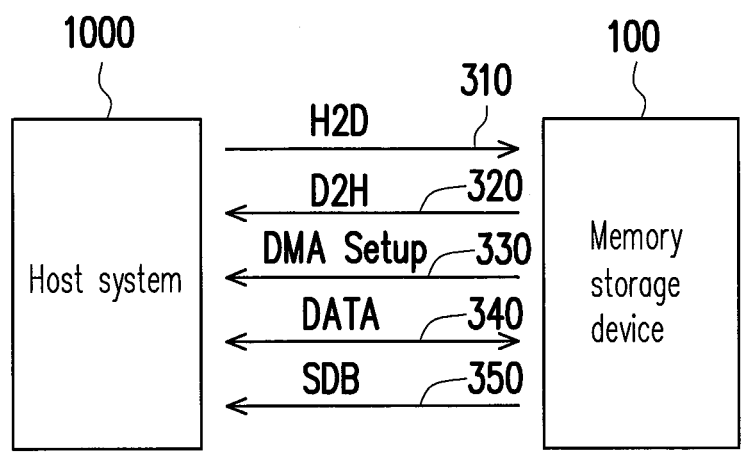
FIG. 3 is a schematic diagram illustrating a transmission between a memory storage device 100 and a host system 1000 according to an exemplary embodiment.

FIG. 3 is a schematic diagram illustrating a transmission between a memory storage device 100 and a host system 1000 according to an exemplary embodiment.

Referring to FIG. 3 in which the SATA standard is taken as an example, execution of one command is completed by exchanging a plurality of frame information structures (FIS) between the host system 1000 and the memory storage device 100. It should be noted that in the SATA standard, FIS belong to transport layer, thus FIS can still be included in other data structures, and persons skilled in the art should be able to understand how to transmit FIS. In addition, other signals may also be exchanged between the host system 1000 and the memory storage device 100, and the invention is not limited thereto. When the host system 1000 intends to issue a command to the memory storage device 100, the host system 1000 first transmits a host to device (H2D) FIS 310 to the memory storage device 100. The FIS 310 is configured to indicate a status of the host system 1000 or information of the command. Herein, the FIS 310 includes a tag corresponding to the command. Subsequently, the memory storage device 100 transmits a device to host (D2H) FIS 320 to the host system 1000. After the FIS 310 and 320 are exchanged, it indicates that the command has been transferred to the memory storage device 100, and such command is stored in a command queue. The memory storage device 100 can decide an execution sequence for the commands in the command queue.

When the memory storage device 100 intends to execute the command in the command queue, the memory storage device 100 transmits a direct memory access setup (DMA setup) FIS 330 to the host system 1000. The FIS 330 includes the tag corresponding to the command to be executed. The command to be executed can be a write command, a read command or a command with arbitrary content, and the invention is not limited thereto. Subsequently, the host system 1000 then transmits a data FIS 340 to the memory storage device 100 (e.g., in case the write command is executed); or, the memory storage device 100 transmits the data FIS 340 to the host system 1000 (e.g., in case the read command is executed). Based on above, the host system 1000 and the memory storage device 100 decide which command is to be executed according to the tag. When a command is executed and the command is still corresponding to a tag, the host system 1000 cannot re-utilize the tag for issuing another command. Thus, after the command is executed, the memory storage device 100 transmits a set device bits (SDB) FIS 350 to the host system 1000. The FIS 350 is configured to release one tag from corresponding to one command. For instance, it is assumed that the FIS 350 is configured to release a tag "0" from corresponding to a command. In this case, after the FIS 350 is received, the host system 1000 can then issue another command which is corresponding to the tag "0" to the memory storage device 100.

In the present exemplary embodiment, the memory storage device 100 determines whether an operating status of the memory storage device 100 meets a predetermined condition. The memory storage device 100 transmits a configuration message to the host system 1000 when the operating status of the memory storage device 100 meets the predetermined condition, so as to release certain tags from corresponding to certain commands. In case the predetermined condition is not satisfied, the configuration message is temporarily not transmitted from the memory storage device 100 to the host system 1000, namely, the command which have been executed is still corresponding to a tag. It should be noted that in the SATA standard, the configuration message is, for example, the FIS 350. However, in other standards, the configuration message can be other messages for releasing the tag from corresponding to the command, and the invention is not limited thereto.

Figure 4:
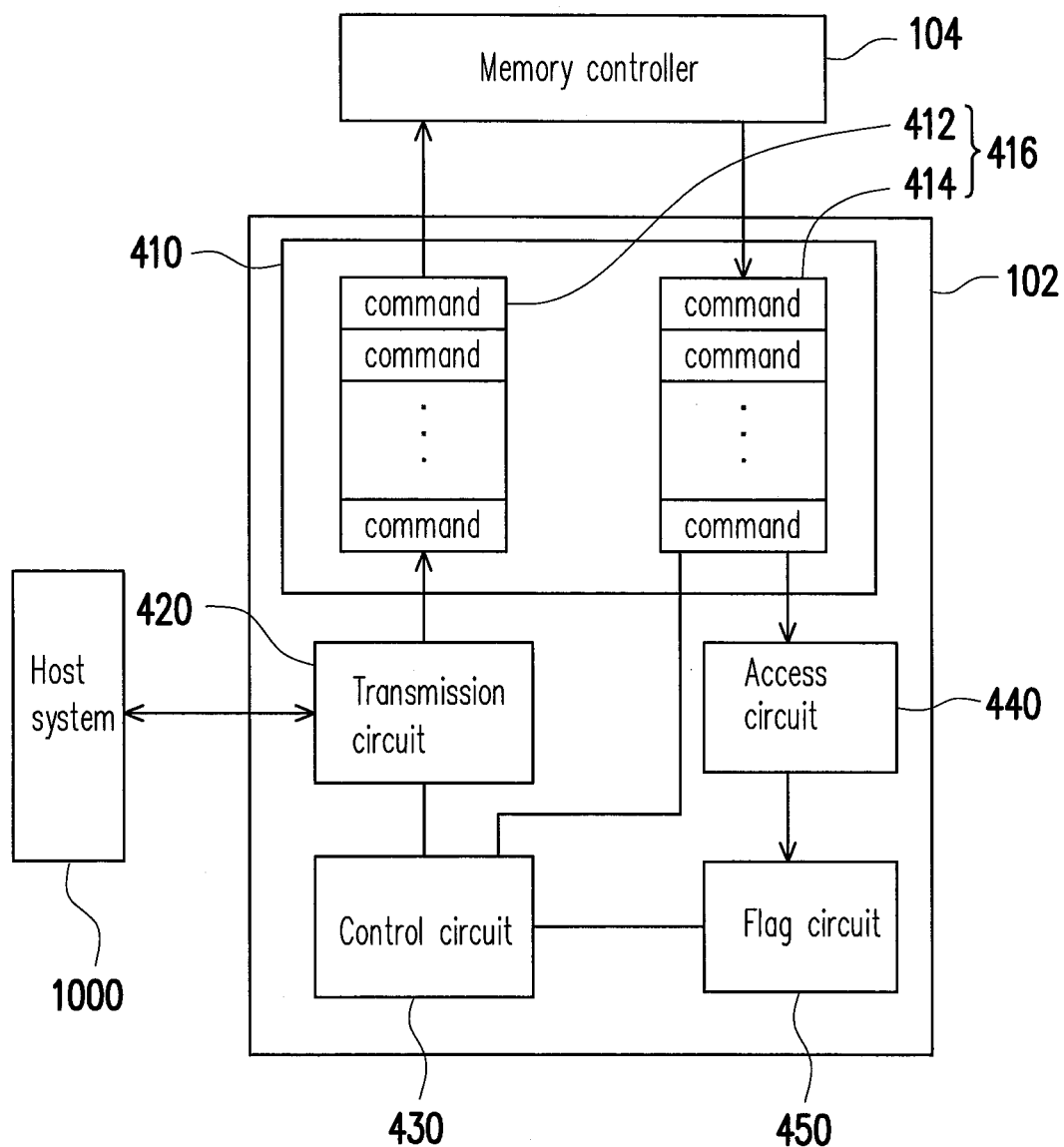
FIG. 4 is a schematic block diagram illustrating a connector according to an exemplary embodiment.

FIG. 4 is a schematic block diagram illustrating a connector according to an exemplary embodiment.

Referring to FIG. 4, a connector 102 includes a memory 410, a transmission circuit 420, a control circuit 430, an access circuit 440 and a flag circuit 450.

A command queue 416 is stored in the memory 410. In the present exemplary embodiment, the command queue 416 is implemented as a receive command queue 412 and a trigger queue 414. When the host system 1000 transmits a command to the connector, the command is first being temporally stored in the receive command queue 412. The memory controller 104 decides an execution sequence, and moves one or more commands from the receive command queue 412 to the trigger queue 414 according to the execution sequence.

The transmission circuit 420 is coupled to the memory 410, and configured to receive messages (also called signals) from the host system 1000 and transmit the messages to the host system 1000. For instance, the transmission circuit 420 is compatible with physical layer and link layer in the SATA standard.

The control circuit 430 is coupled to the transmission circuit 420, and configured to determine whether the operating status of the memory storage device 100 meets said predetermined condition.

The access circuit 440 is coupled to the memory 410 and the flag circuit 450, and configured to execute operations related to a direct memory access (DMA). For instance, in order to execute a command in the trigger queue 414, it may require a buffer memory space used to temporally store data to be read or data to be written. A sub-space in the memory 410 may be allocated as the buffering memory space; or, another memory in the memory storage device 100 can also be used as said buffer memory space, and the invention is not limited thereto. When the buffer memory space required for a command in the trigger queue 414 is ready, the transmission circuit 420 then transmits the tag corresponding to such command to the host system 1000. Then, the access circuit 440 writes the data received from the host system 1000 into the buffer memory space; or, the access circuit 440 stores the data read from the rewritable non-volatile memory module 106 into the buffer memory space, so as to transmit the data through the transmission circuit 420 to the host system 1000. After the read or write operations are executed, this indicates that the command has been executed.

The flag circuit 450 is coupled to the access circuit 440 and the control circuit 430. A plurality of flags are stored in the flag circuit 450, and each of the flags is corresponding to a tag. After the access circuit 440 executes a command, the access circuit 440 raises a corresponding flag in the flag circuit 450. Accordingly, the control circuit 430 can be informed of which command being executed yet still corresponding to one tag. After the configuration message is transmitted by the transmission circuit 420 to the host system 1000, the corresponding flag is reset.

In an exemplary embodiment, once the access circuit 440 decides to execute a first command in the trigger queue 414, the first command is then removed from the trigger queue 414, and the trigger queue 414 further includes one or more second commands. The control circuit 430 determines whether the buffer memory space required for the each of the second commands is ready. If none of buffer memory space required for the second commands is ready, the control circuit 430 further determines whether a connection between the memory storage device 100 and the host system 1000 is idle for over a preset time. If the connection is idle for over the preset time, the control circuit 430 determines the operating status of the memory storage device 100 meets said predetermined condition, in other words, after the first command is executed, the control circuit 430 drives the transmission circuit 420 to transmit the configuration message to the host system 1000, so as to release the first command from corresponding to the tag. In addition, the control circuit 430 can execute said determinations at any time point. For instance, the control circuit 430 may monitor whether the buffer memory space required for the second commands is ready in a manner of pooling, and then determine whether the connection is idle for over the preset time.

In another exemplary embodiment, the control circuit 430 determines whether the buffer memory space required for the first command is ready before the first command in the trigger queue 414 is executed. If none of the buffer memory space required for the first command is ready, the control circuit 430 determines whether the connection between the host system 1000 and the memory storage device 100 is idle for over the preset time. If the connection is idle for over the preset time, the control circuit 430 further determines whether the memory storage device 100 has executed at least another command (i.e., the second command) and has yet to transmit the configuration message to the host system 1000 (i.e., the second command is still corresponding to a second tag). If the memory storage device 100 has executed the second command and has yet to transmit the configuration message to the host system 1000, the control circuit 430 then determines that the operating status of the memory storage device 100 meets the preset condition. In other words, although the first command is not yet executed, the configuration message is still being transmitted to the host system 1000, so as to release the second tag from corresponding to the command.

Accordingly, since the configuration message is transmitted when the connection between the memory storage device 100 and the shot system 1000 is idle, the connection being established can be effectively utilized, so as to increase an access bandwidth of the memory storage device 100. Herein, the access bandwidth refers to an amount of data which is written (through a plurality of write commands) to the memory storage device 100 per second, or data which is read (through a plurality of read commands) from the memory storage device 100 per second, by the host system 1000.

In an exemplary embodiment, after one command is removed from the trigger queue 414, the control circuit 430 determines whether the trigger queue 414 includes a command pending for execution. If the trigger queue 414 does not include the command pending for execution, the control circuit 430 determines that the operating status of the memory storage device 100 meets the predetermined condition, and drives the transmission circuit 420 to transmit the configuration message to the host system 1000. Similarly, the control circuit 430 can also determine whether the trigger queue 414 includes the command pending for execution at any time point.

In an exemplary embodiment, after the first command in the trigger queue 414 is executed by the access circuit 440, the control circuit 430 obtains a count value. Such count value indicates a number of the command being executed yet still corresponding to one tag. For instance, the control circuit 430 can calculate the count value by counting the flags being raised in the flag circuit 450. However, the control circuit 430 can also add one to the count value after one command is executed, and reset the count value after the configuration message is transmitted to the host system 1000, but the invention is not limited thereto. The control circuit 430 determines whether the count value is greater than a threshold value. In case the count value is greater than the threshold value, the control circuit 430 determines that the operating status of the memory storage device 100 meets the predetermined condition, that is, the control circuit 430 drives the transmission circuit 420 to transmit the configuration message to the host system 1000, so as to release the first command from corresponding to one tag.

Since when a tag is corresponding to one command, said tag cannot be utilized by the host system 1000 for issuing another command, in an exemplary embodiment, the memory controller 104 decides the threshold value according to a first command amount of the receive command queue 412. The first command amount indicates a maximum number of tags that the host system 1000 may utilize for issuing commands. In the SATA standard, the host system 1000 can use up to 32 tags, but practically the host system 1000 may only use only 16 or 24 tags. Therefore, when the first command amount is smaller, the said threshold value is accordingly smaller, so as to avoid a situation in which the host system 1000 cannot issue other commands. For instance, the memory controller 104 may set the threshold value as a ⅔ of the first command amount, but the invention is not limited thereto. More specifically, the memory controller 104 will continue to determine whether a number of the commands (also referred as a second command amount) of the receive command queue 412 is greater than the first command amount. If the second command amount of the receive command queue 412 is greater than the first command amount, the memory controller 104 sets the first command amount as identical to the second command amount.

Figure 5:
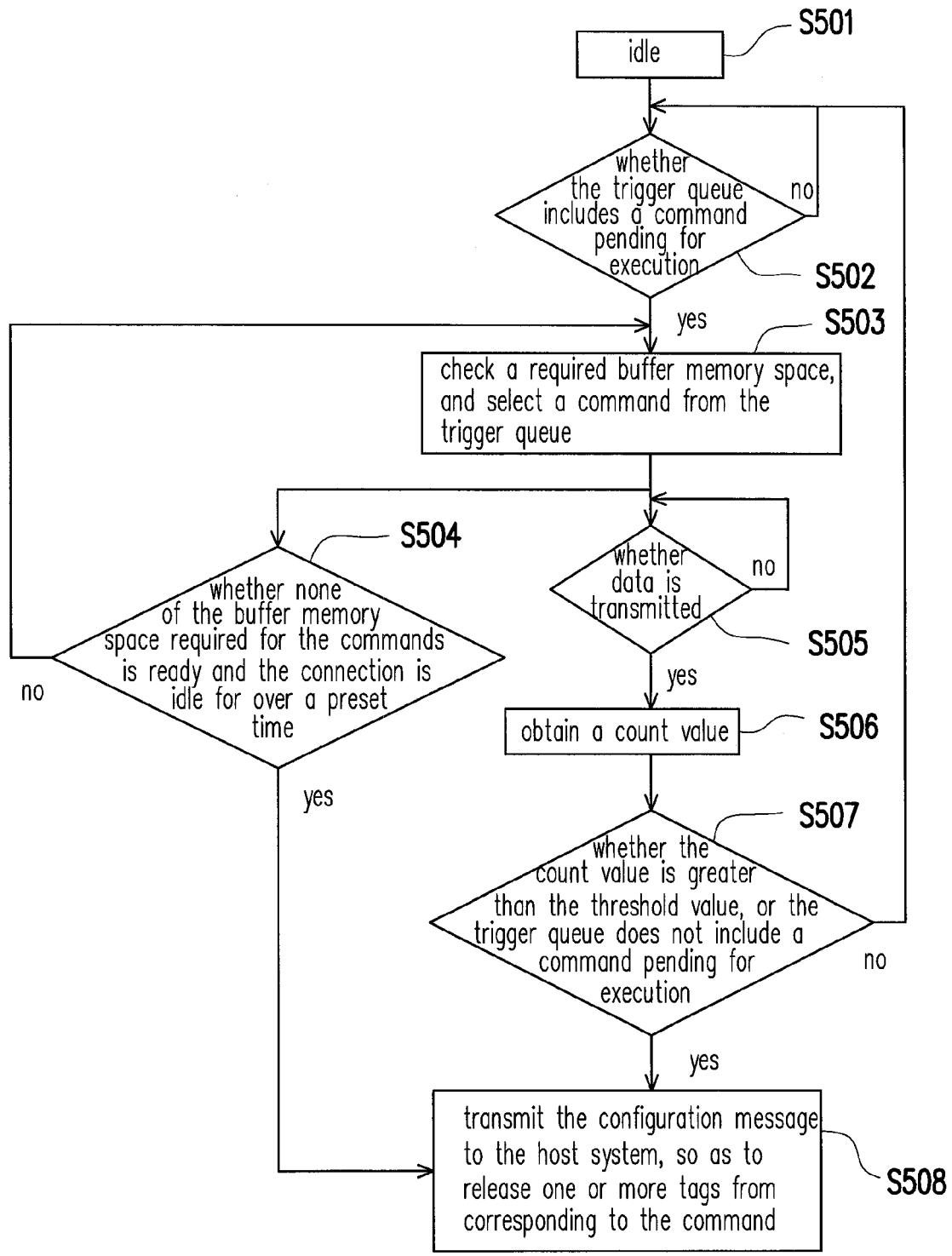
FIG. 5 illustrates a flowchart for determining whether an operating status of the memory storage device meets a predetermined condition according to an exemplary embodiment.

In the present exemplary embodiment, the threshold value is decided by the memory controller 104. In other embodiments, the threshold value may be decided by the control circuit 430, and the first command amount may also be decided by the control circuit 430, and the invention is not limited thereto. On the other hand, a plurality of situations as mentioned above can be arbitrarily combined for determining that the operating status of the memory storage device 100 meets the predetermined condition. For instance, the control circuit 430 may determine that the operating status meets the predetermined condition when the count value is greater than the threshold value or the trigger queue 414 dos not include the command pending for execution. FIG. 5 illustrates a flowchart for determining whether an operating status of the memory storage device meets a predetermined condition according to an exemplary embodiment. Referring to FIG. 5, in step S501, the access circuit 440 is idle. In step S502, the control circuit 430 and the access circuit 440 determine whether the trigger queue 414 includes a command pending for execution. If the trigger queue 414 includes the command pending for execution, in step S503, the access circuit 440 checks a required buffer memory space, and select a command from the trigger queue 414. In step S504, the control circuit 430 determines whether none of the buffer memory space required for the commands is ready and a connection between the host system 1000 and the memory storage device 100 is idle for over a preset time. If the buffer memory required for a command in the trigger queue 414 is ready, or the connection between the host system 100 and the memory storage device 100 is not idle for over the preset time, then go back to step S503. In addition, in step S505 (noted that step S504 and step S505 can be executed simultaneously), the access circuit 440 starts to execute a command (e.g., starts to read or write data) and determine whether the data is transmitted. After the data is transmitted, the control circuit 430 obtains a count value in step S506. In step S507, the control circuit 430 determines whether the count value is greater than the threshold value, or the trigger queue 414 does not include a command pending for execution. If the count value is less than or equal to the threshold value and the trigger queue 414 includes a command pending for execution, then go back to step S502. If a result of the determination in step S507 is yes, or a result of the determination in step S504 is yes, the control circuit 430 drives the transmission circuit 420 to transmit the configuration message to the host system 1000, so as to release one or more tags from corresponding to the command in step S508.

It should be noted that, in step S508, the configuration message transmitted to the host system 1000 can be configured to release several tags from corresponding to commands. For instance, the transmission circuit 420 receives a first command and a second command from the host system 1000 and stores the first command and the second command to the receive command queue 412. The transmission circuit 420 also receives a first tag corresponding to the first command and a second tag corresponding to the second command. After the first command is executed (step S506), a result of the determination in step S507 is no. Next, the second command is executed, namely, the second tag corresponding the second command is transmitted to the host system 1000 by the transmission circuit 420, and the access circuit 440 transmits a corresponding data (step S505). Subsequently, the result of the determination in step S507 is yes (or the result of the determination in step S504 is yes), therefore in step S508, the transmission circuit 420 transmits the configuration message to the host system 1000, so as to release the first tag and the second tag from corresponding to the commands.

Figure 6:
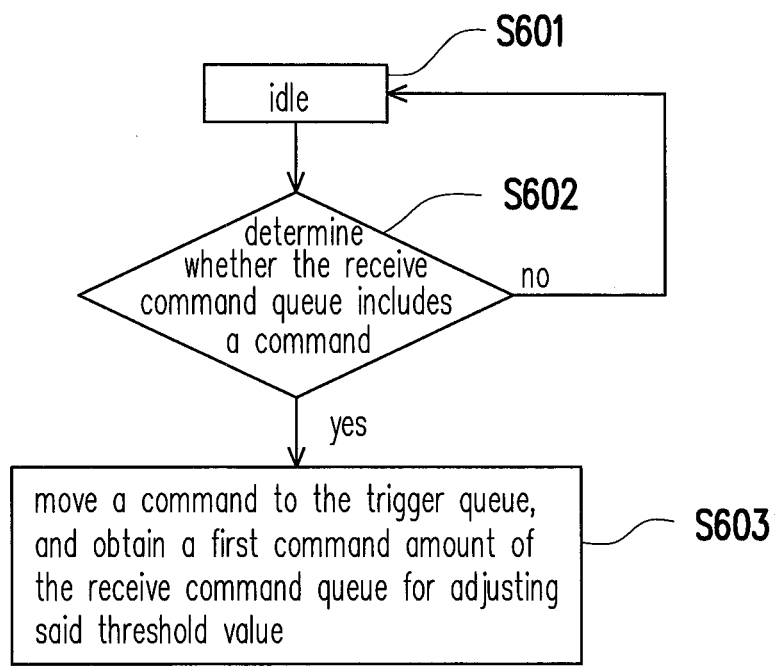
FIG. 6 illustrates a flowchart for operating the memory controller according to an exemplary embodiment.

FIG. 6 illustrates a flowchart for operating the memory controller according to an exemplary embodiment.

Referring to FIG. 6, in step S601, the memory controller 104 is in an idle status. In step S602, the memory controller 104 determines whether the receive command queue 412 includes a command. If a result of the determination in step S602 is yes, in step S603, the memory controller 104 moves the command to the trigger queue 414, and obtains the first command amount of the receive command queue 412 for adjusting said threshold value.

Figure 7:
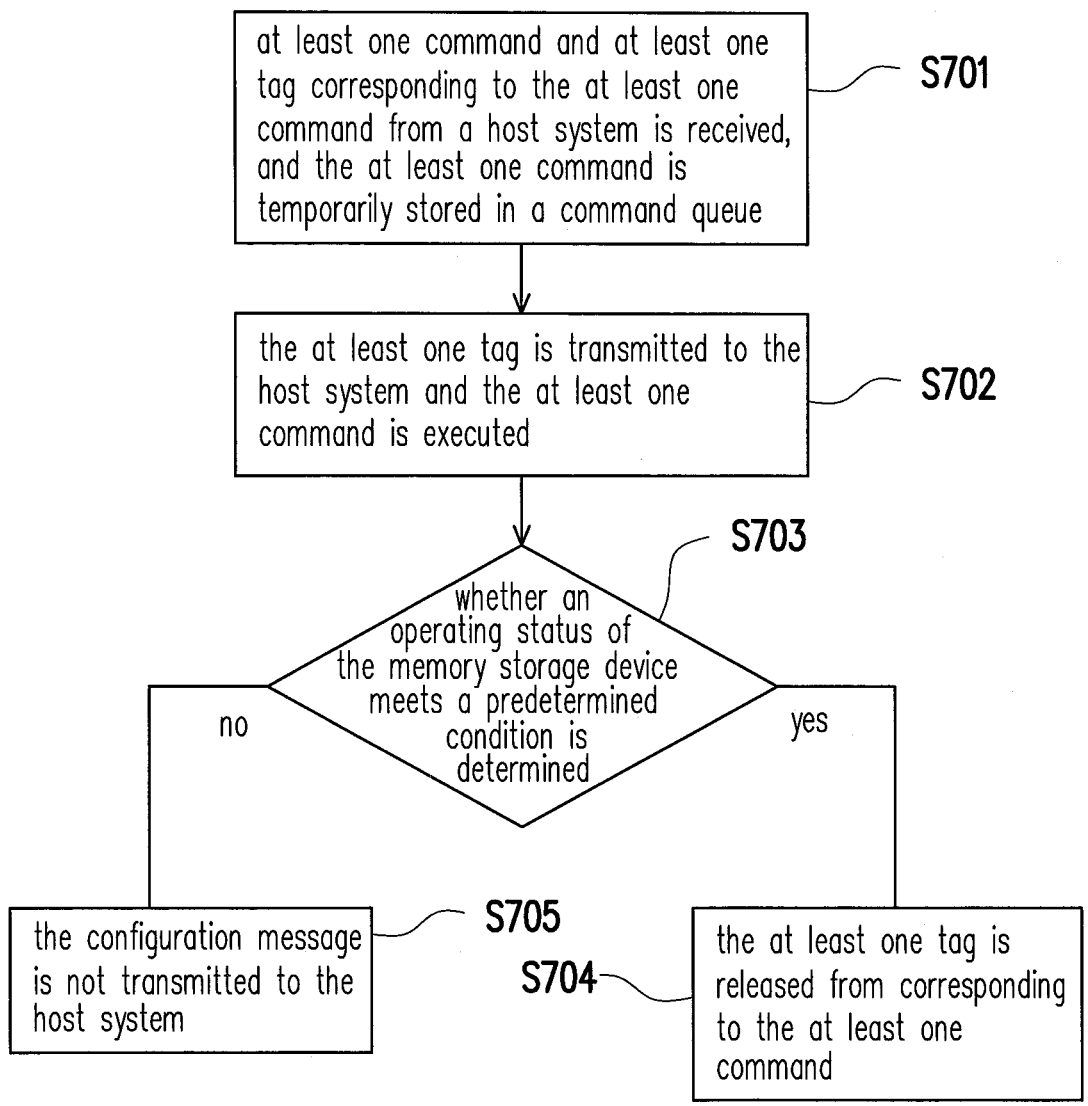
FIG. 7 is a flowchart illustrating a command executing method according to an exemplary embodiment.

FIG. 7 is a flowchart illustrating a command executing method according to an exemplary embodiment.

Referring to FIG. 7, in step S701, at least one command and at least one tag corresponding to the at least one command from a host system is received, and the at least one command is temporarily stored in a command queue. In step S702, the at least one tag is transmitted to the host system and the at least one command is executed. In step S703, whether an operating status of the memory storage device 100 meets a predetermined condition is determined. If a result of the determination in step S703 is yes, in step S704, the configuration message is transmitted to the host system so as to release a status the at least one tag from corresponding to the at least one command. If the predetermined condition is not satisfied, in step S705, the configuration message is not transmitted to the host system. It should be noted that, in step S705, it does not mean that the configuration message is not transmitted to the host system 1000, permanently. At any time point, when the predetermined condition is satisfied, the configuration message is then being transmitted to the host system 1000.

Steps depicted in FIG. 7 are described in detail as above, thus it is omitted hereinafter. It should be noted that, each of steps in FIG. 7 can be implemented as a plurality of program codes or circuits (e.g., the transmission 420, the control circuit 430 and the access circuit 440), and the invention is not limited thereto. In addition, the method disclosed in FIG. 7 can be used accompanying the foregoing exemplary embodiments, or can be used separately, and the invention is not limited thereto.

In summary, the command executing method, the connector and the memory storage device as provided in the exemplary embodiments of the invention is capable of transmitting the configuration message to the host system only when the predetermined condition is satisfied. Accordingly, one configuration message can be utilized to release several tags from corresponding to commands, and the number of the configuration messages transmitted between the host system and the memory system memory is reduced. With data required to be transmitted for each command being smaller, the more of the access bandwidth of the memory storage device is increased.

The previously described exemplary embodiments of the present invention have the advantages aforementioned, wherein the advantages aforementioned not required in all versions of the invention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A command executing method for a memory storage device, comprising:
receiving commands and tags respectively corresponding to the commands from a host system, and temporarily storing the commands in a command queue;
transmitting the tags to the host system and executing the commands;
in response to completion of executing the commands, keeping the tags corresponding to the commands by holding a configuration message for releasing the tags from corresponding to the commands being transmitted to the host system;

determining whether an operating status of the memory storage device meets a predetermined condition while holding the configuration message; and transmitting, if the operating status meets the predetermined condition, the configuration message to the host system to release the tags from corresponding to the commands, wherein one of the tags is re-corresponded to another command to be executed after the tags are released from corresponding to the commands.

2. The command executing method of claim 1, wherein before the commands are executed, the command executing method further comprises:

determining whether a buffer memory space required for executing the commands is ready;

determining, if the buffer memory space is not ready, whether a connection between the host system and the memory storage device is idle for over a preset time;

determining, if the connection is idle for over the preset time, whether the memory storage device has executed at least one another command and has yet to transmit the configuration message to the host system; and determining that, if the memory storage device has executed the at least one another command and has yet to transmit the configuration message to the host system, the operating status meets the predetermined condition.

3. The command executing method of claim 1, wherein determining whether the operating status of the memory storage device meets the predetermined condition comprises:

determining, after the commands are executed, whether the command queue includes a command pending for execution; and determining that, if the command queue does not include the command pending for execution, the operating status meets the predetermined condition.

4. The command executing method of claim 1, wherein determining whether the operating status of the memory storage device meets the predetermined condition comprises:

obtaining a count value after the commands are executed;

determining whether the count value is greater than a threshold value; and determining that, if the count value is greater than the threshold value, the operating status meets the predetermined condition.

5. The command executing method of claim 4, wherein the step of obtaining the count value comprises:

recording a plurality of flags;

raising at least one of the flags after the commands are executed; and calculating the count value by counting the flags being raised.

6. The command executing method of claim 4, wherein the command queue comprises a receive command queue and a trigger queue, and the commands are moved from the receive command queue to the trigger queue according to an execution sequence, and the command executing method further comprises:

deciding the threshold value according to a first command amount of the receive command queue.

7. The command executing method of claim 6, wherein the commands are temporally stored in the receive command queue when the commands are received, and the command executing method further comprises:

determining whether a second command amount of the receive command queue is greater than the first command amount; and setting the first command amount as identical to the second command amount if the second command amount of the receive command queue is greater than the first command amount.

8. A connector, comprising:

a memory configured to store a command queue;

a transmission circuit coupled to the memory and configured to receive commands and tags corresponding to the commands from a host system, and temporarily store the commands in a command queue;

an access circuit coupled to the memory; and a control circuit coupled to the transmission circuit and the access circuit, wherein the transmission circuit is configured to transmit the tags to the host system, and the access circuit is configured to execute the commands, wherein the transmission circuit keeps the tags corresponding to the commands by holding a configuration message for releasing the tags from corresponding to the commands being transmitted to the host system in response to completion of executing the commands, wherein the control circuit is configured to determine whether an operating status of the memory storage device meets a predetermined condition while the configuration message is held, if the operating status meets the predetermined condition, the transmission circuit transmits the configuration message to the host system to release the tags from corresponding to the commands, wherein one of the tags is re-corresponded to another command to be executed after the tags are released from corresponding to the commands.

9. The connector of claim 8, wherein before the commands are executed, the control circuit is further configured to determine whether a buffer memory space required for executing the commands is ready, if the buffer memory space is not ready, the control circuit is configured to determine whether a connection between the host system and the memory storage device is idle for over a preset time;

if the connection is idle for over the preset time, the control circuit is configured to determine whether the access circuit has executed at least one another command and the transmission circuit has yet to transmit the configuration message to the host system; and if the access circuit has executed the at least one another command and the transmission circuit has yet to transmit the configuration message to the host system, the control circuit is configured to determine that the operating status meets the predetermined condition.

10. The connector of claim 8, wherein the operation that the control circuit determines whether the operating status of the memory storage device meets the predetermined condition comprises:

the control circuit determines whether the command queue includes a command pending for execution after the commands are executed by the access circuit; and the control circuit determines that the operating status meets the predetermined condition if the command queue does not include the command pending for execution.

11. The connector of claim 8, wherein the operation that the control circuit determines whether the operating status of the memory storage device meets the predetermined condition comprises:
  the control circuit obtains a count value after the commands are executed by the access circuit;
  the control circuit determines whether the count value is greater than a threshold value; and
  the control circuit determines that the operating status meets the predetermined condition if the count value is greater than the threshold value.

12. The connector of claim 11, further comprising:
  a flag circuit coupled to the access circuit and the control circuit, and configured to record a plurality of flags,
  wherein the access circuit is configured to raise at least one of the flags after the commands are executed; and
  wherein the control circuit is configured to calculate the count value by counting the flags being raised.

13. The connector of claim 11, wherein the command queue comprises a receive command queue and a trigger queue, and the commands are moved from the receive command queue to the trigger queue according to an execution sequence,
  wherein the control circuit if further configured to decide the threshold value according to a first command amount of the receive command queue.

14. The connector of claim 13, wherein when the commands are received by the transmission circuit, the transmission circuit temporally stores the commands in the receive command queue,
  wherein the control circuit is further configured to determine whether a second command amount of the receive command queue is greater than the first command amount,
  wherein if the second command amount of the receive command queue is greater than the first command amount, the control circuit is configured to set the first command amount as identical to the second command amount.

15. A memory storage device, comprising:
  a connector configured to couple to a host system;
  a rewritable non-volatile memory module including a plurality of physical erasing units;
  a memory controller coupled to the connector and the rewritable non-volatile memory,
  wherein the connector comprises:
  a memory configured to store a command queue;
  a transmission circuit coupled to the memory and configured to receive commands and tags corresponding to the commands from a host system, and temporarily store the commands in a command queue;
  an access circuit coupled to the memory; and
  a control circuit coupled to the transmission circuit and the access circuit,
  wherein the transmission circuit is configured to transmit the tags to the host system, and the access circuit is configured to execute the commands,
  wherein the transmission circuit is configured to keep the tags corresponding to the commands by holding a configuration message for releasing the tags from corresponding to the commands being transmitted to the host system in response to completion of executing the commands,
  wherein the control circuit is configured to determine whether an operating status of the memory storage device meets a predetermined condition while the configuration message is being held,
  if the operating status meets the predetermined condition, the transmission circuit transmits the configuration message to the host system to release the tags from corresponding to the commands, wherein one of the tags is re-corresponded to another command to be executed after the tags are released from corresponding to the commands.

16. The memory storage device of claim 15, wherein before the commands are executed, the control circuit is further configured to determine whether a buffer memory space required for executing the commands is ready,
  if the buffer memory space is not ready, the control circuit is configured to determine whether a connection between the host system and the memory storage device is idle for over a preset time;
  if the connection is idle for over the preset time, the control circuit is configured to determine whether the access circuit has executed at least one another command and the transmission circuit has yet to transmit the configuration message to the host system; and
  if the access circuit has executed the at least one another command and the transmission circuit has yet to transmit the configuration message to the host system, the control circuit is configured to determine that the operating status meets the predetermined condition.

17. The memory storage device of claim 15, wherein the operation that the control circuit determines whether the operating status of the memory storage device meets the predetermined condition comprises:
  the control circuit determines whether the command queue includes a command pending for execution after the commands are executed by the access circuit; and
  the control circuit determines that the operating status meets the predetermined condition if the command queue does not include the command pending for execution.

18. The memory storage device of claim 15, wherein the operation that the control circuit determines whether the operating status of the memory storage device meets the predetermined condition comprises:
  the control circuit obtains a count value after the commands are executed by the access circuit;
  the control circuit determines whether the count value is greater than a threshold value; and
  the control circuit determines that the operating status meets the predetermined condition if the count value is greater than the threshold value.

19. The memory storage device of claim 18, wherein the connector further comprises:
  a flag circuit coupled to the access circuit and the control circuit, and configured to record a plurality of flags,
  wherein the access circuit is configured to raise at least one of the flags after the commands are executed; and
  wherein the control circuit is configured to calculate the count value by counting the flags being raised.

20. The memory storage device of claim 18, wherein the command queue comprises a receive command queue and a trigger queue, and the commands are moved from the receive command queue to the trigger queue according to an execution sequence,
  wherein the memory controller is further configured to decide the threshold value according to a first command amount of the receive command queue.

21. The memory storage device of claim 20, wherein when the commands are received by the transmission circuit, the transmission circuit temporally stores the commands in the receive command queue, wherein the memory controller is further configured to determine whether a second command amount of the receive command queue is greater than the first command amount, wherein if the second command amount of the receive command queue is greater than the first command amount, the memory controller is configured to set the first command amount as identical to the second command amount.

* * * * *